United States Patent [19]
Williams

[11] 3,991,468
[45] Nov. 16, 1976

[54] HEDGE TRIMMER HANDLE ATTACHMENT

[76] Inventor: Marvin P. Williams, 88525 Perrywinkle Road, Springfield, Oreg. 97477

[22] Filed: Oct. 10, 1975

[21] Appl. No.: 621,301

[52] U.S. Cl. .................................. 30/298; 30/232
[51] Int. Cl.$^2$ ........................................ B26B 27/00
[58] Field of Search .................. 30/232, 296 R, 298, 30/312, 340, 381

[56] References Cited
UNITED STATES PATENTS

| | | | |
|---|---|---|---|
| 2,062,820 | 12/1936 | Pierce | 30/312 UX |
| 2,697,457 | 12/1954 | Lawrence | 30/296 X |
| 3,409,056 | 11/1968 | Rauh | 30/381 |
| 3,453,732 | 7/1969 | Wilkin | 30/296 R |
| 3,845,557 | 11/1974 | Bailey | 30/381 |

Primary Examiner—Al Lawrence Smith
Assistant Examiner—James G. Smith
Attorney, Agent, or Firm—James D. Givnan, Jr.

[57] ABSTRACT

A handle attachment of tubular construction for electrically powered hedge trimmers enabling the latter to be used for ground clearing purposes while the operator remains in a standing position. A first handle component is detachably mounted at its lower end to the hedge trimmer and extends upwardly terminating in a handhold located a substantial distance above the hedge trimmer. An additional handhold is provided by a rearwardly extending second handle component coupled to the first handle component and to the motor housing of the trimmer to provide a rigid handle structure. A clamp and fasteners removably mount the handle attachment to the trimmer which may be readily detached permitting ordinary use of the trimmer.

2 Claims, 6 Drawing Figures

U.S. Patent  Nov. 16, 1976  3,991,468
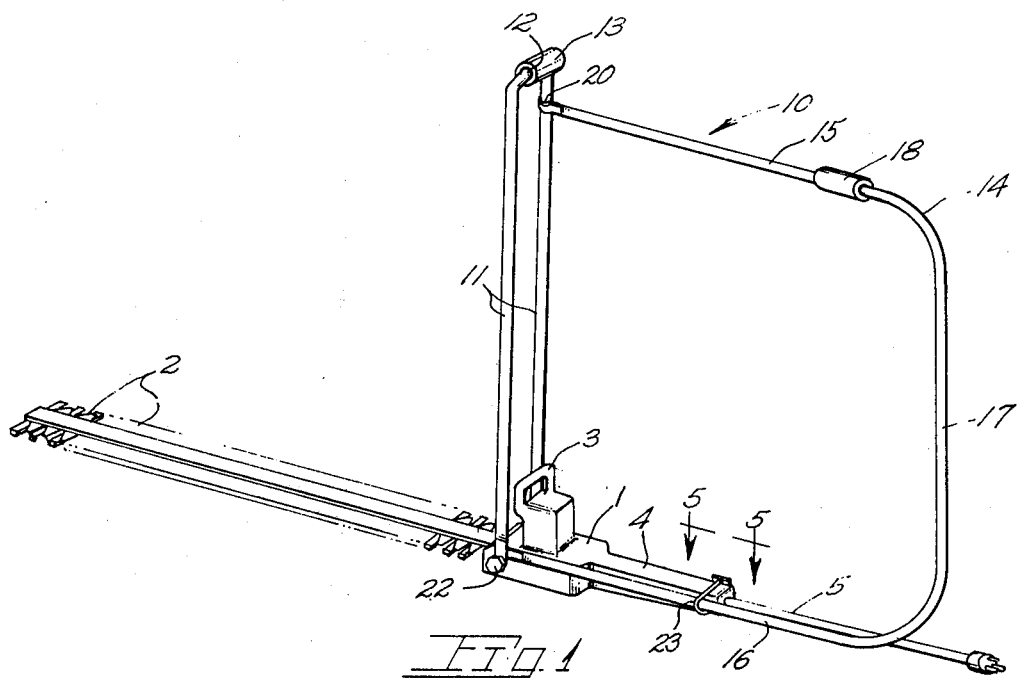
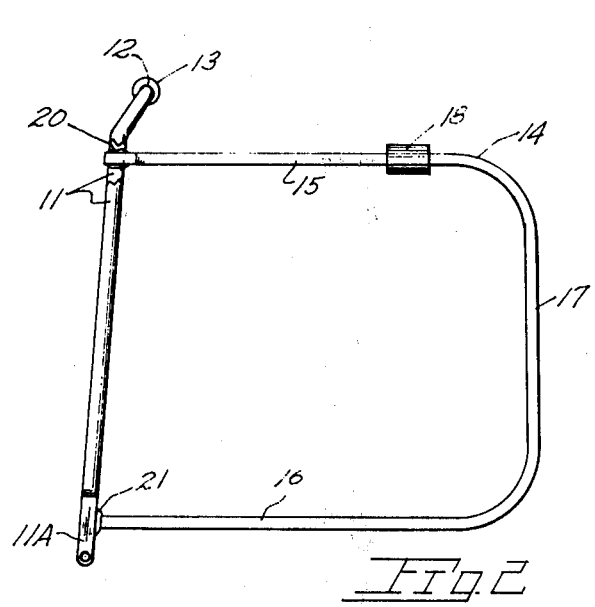
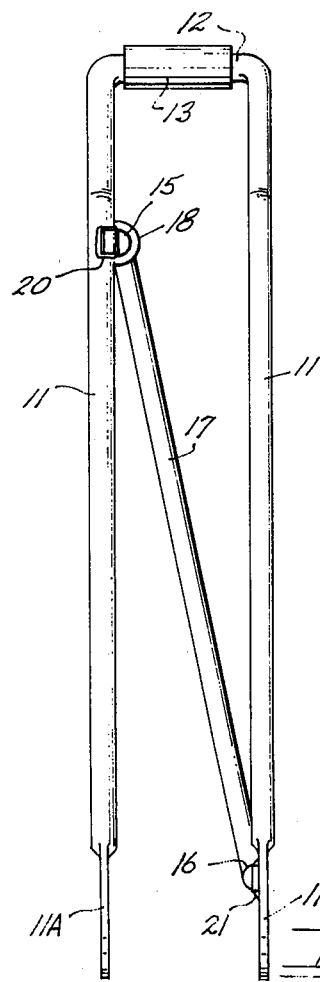
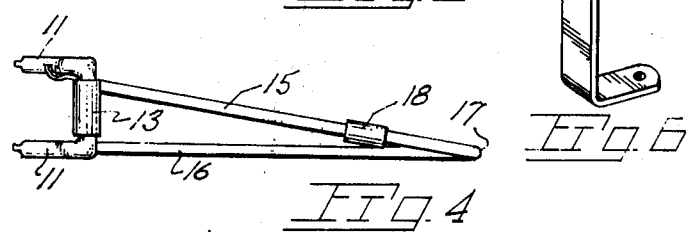
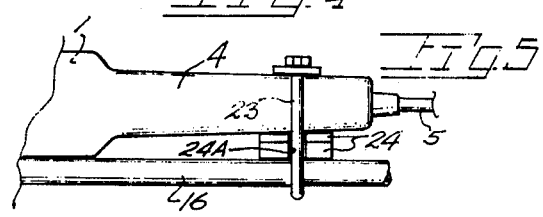
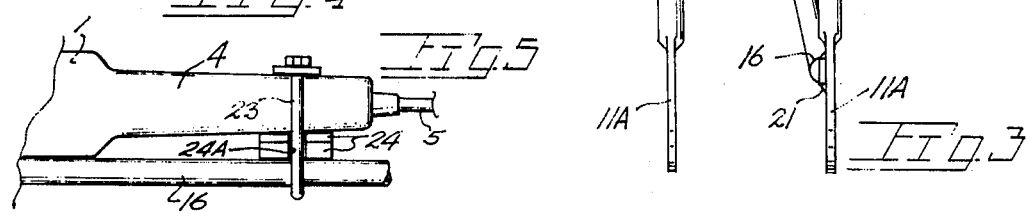

HEDGE TRIMMER HANDLE ATTACHMENT

BACKGROUND OF THE INVENTION

The present invention relates generally to electrically powered hedge trimmers and, more particularly, to a handle attachment readily attachable to the trimmer motor housing permitting the trimmer to be used at ground level for the clearing of brush and the like without stooping of the operator being required.

In wide use today are hand-held electrically powered trimmers having a motor driving a reciprocating blade assembly with the motor housing configured so as to provide a pair of handholds. Such trimmers are conveniently used only at waist level or thereabouts in different trimming operations and do not lend themselves to cutting operations in close proximity to the ground. Accordingly, such trimmers are limited to the trimming of shrubbery, vines and the like.

SUMMARY OF THE PRESENT INVENTION

The present invention is embodied within a tubular handle attachment adapted for convenient, rigid securement to the motor housing of an electric hedge trimmer. The handle structure provides a pair of handholds elevated from the trimmer to permit use of the trimmer at ground level in various ground clearing operations while the operator remains standing. The handle structure is adapted for secure, removable attachment to a wide variety of trimmer motor housings, thus permitting a much wider range of use than originally intended. A first handle attachment component provides a handhold above and transversely orientated to the trimmer center line while a second handhold is spaced rearwardly from the first on a rearwardly extending second handle component. Accordingly, the widely spaced apart handholds permit the reciprocating blade to be forcefully urged into positive contact with the vegetable growth being cut without risk of injury to the user. Means are also provided for securely clamping the rearwardly extending, second handle component to the existing handle portion of the trimmer motor housing. Said rearwardly extending second handle component additionally serves to retain the power cord away from the blade.

Important objectives of the present invention include the provision of a handle attachment enabling the use of a hedge trimmer at ground level for the purpose of cutting heavy grass, undergrowth, vines, small bushes, and other growth previously cut by a hand held scythe or wheel supported, motorized sickle; the provision of a light-weight tubular handle structure readily attached to a wide variety of motor trimmer housings greatly increasing the functional uses of the hedge trimmer; the provision of a sturdy handle attachment for an electrical hedge trimmer which not only permits same to be used for ground level cutting but provides a great deal of operator control precluding any risk of injury to the user; the provision of a handle attachment for a hedge trimmer readily mountable on and removable from a hedge trimmer without modification thereof; and the provision of a handle attachment along a portion of which is routed the trimmer electrical cord directing same away from the reciprocating trimmer blade.

These and other objectives will become subsequently apparent upon an understanding of the following description.

BRIEF DESCRIPTION OF THE DRAWING

In the accompanying drawing:

FIG. 1 is a perspective view of the handle attachment in combination with a powered hedge trimmer of conventional appearance, FIG. 2 is a side elevational view of the handle attachment separated from the motor housing of the trimmer, FIG. 3 is a left-hand side elevational view of FIG. 2 on an enlarged scale, FIG. 4 is a plan view of FIG. 2, FIG. 5 is a horizontal plan view taken along line 5—5 of FIG. 1, and FIG. 6 is a fragmentary perspective view of a modified handle attachment.

DETAILED DESCRIPTION OF THE PREFERRED EMBODIMENTS

With continuing attention to the accompanying drawing wherein applied reference numerals indicate parts similarly identified in the description, the reference numeral 1 indicates the motor housing of an electrical hedge trimmer while reference numeral 2 indicates a blade assembly of the conventional type having stationary members along with a reciprocating, toothed blade.

Motor housing 1 is typically of molded, plastic construction shaped to provide hand holds indicated at 3 and 4 permitting grasping of the trimmer by both of the user's hands. An electrical service cord at 5 extends rearwardly from handle portion 4 of the housing. The foregoing description of an electrical hedge trimmer is intended to be more or less typical of existing trimmers and is not intended as a description of any specific trimmer model. The blades of such trimmers range in length however, the present invention is best used in conjunction with a heavy-duty trimmer having a blade length of approximately 16 to 20 inches.

The present invention is embodied within a handle structure indicated generally at 10, the same being preferably of lightweight tubular construction for attachment, as later described, by means of existing fastener means on the trimmer housing 1. A first handle component is shown at 11 and comprises parallel members extending upwardly from housing 1 terminating in a cross piece 12 which serves to support a handhold 13. The lower end of handle component 11 terminates in detachable securement to motor housing 1, preferably by use of existing fasteners 14, or somewhat longer fasteners, which threadingly engage existing threaded bores within housing 1 and a motor chassis (not shown). Such fasteners, in some instances, secure housing components to one another as well as to supporting trimmer structure.

A second handle component is shown at 14 as being of U-shape and includes upper and lower members 15 and 16 interconnected at their rearward ends by an upright intermediate portion 17. A handhold at 18 is provided for the user's remaining hand and is spaced a substantial distance from the first to assure ease of trimmer control. The second handle component terminates forwardly in securement to handle component 11 preferably by means of welds at 20 and 21.

As best viewed in FIG. 3, the lower ends of the first handle component are flattened to facilitate connection with the motor housing by means of a fastener as at 22.

With attention to FIG. 6, a modified form of handle structure 11 is shown wherein the flattened ends are inwardly directed to receive fasteners (not shown) in threaded engagement with the underside of the motor housing.

Additionally securing the second handle component 14 to housing 1 is a clamp 23 which extends about the rearwardly extending handle portion 4 of the motor housing. Spacer elements at 24, which may be of various thicknesses, serve to space the handle components away from the reduced handle portion of the motor housing. Said spacer elements, for purposes of retention, may be slotted as at 24A to receive the legs of clamp 23.

As best viewed in FIG. 3, the second handle component is secured to opposite members of the first component for purposes of rigidity.

In operation, the handle structure is secured to the motor housing which, in some instances, may be accomplished by use of the original motor housing fasteners as at 22 while in other instances fasteners of greater length will have to be substituted. Clamp 23 is applied to the handle portion of the housing with spacers 25 being inserted as needed between the handle portion and handle component 16. If desired, the lower portion 16 of the second handle component may be configured to lie against handle portion 4 of the trimmer. Some motor housings incorporate fastening elements on their underside which will require the modified handle attachment shown in FIG. 6 wherein inwardly turned handle portions are apertured for alignment with pre-existing mounting openings in the trimmer.

While I have shown but a few embodiments of the invention, it will be apparent to those skilled in the art that the invention may be embodied still otherwise without departing from the spirit and scope of the invention.

Having thus described the invention what is claimed and desired to be secured under a Letters Patent is:

1. A handle attachment for a powered hedge trimmer of the type having a reciprocating blade and a motor housing, said attachment permitting stand up use of the trimmer during brush clearing, said handle attachment comprising, a first handle component comprisng elongate parallel members extending upwardly from the trimmer motor housing and mutually terminating upwardly in a cross piece to provide a handhold for a trimmer operator at a elevated distance above the motor housing, a second handle component carried by said first handle component, said second handle component including upper and lower members, said upper member terminating forwardly in attachment to one of said parallel members, said lower member terminating forwardly in attachment to the other of said parallel members, and means detachably mounting the lower ends of said first handle component to said hedge trimmer.

2. The handle attachment claimed in claim 1 wherein said second handle component is of U-shaped configuration, said handle attachment additionally including clamp means detachably mounting said second handle component to the motor housing at a point spaced from said detachable mounting means.

* * * * *